Patented Apr. 6, 1937

2,076,364

UNITED STATES PATENT OFFICE 2,076,364

OXYFLUORIDE OF NITROGEN

George H. Cady, Wadsworth, Ohio

No Drawing. Application August 29, 1936,
Serial No. 98,599

7 Claims. (Cl. 23—203)

The present invention relates to compounds of fluorine and it has particular relation to fluorine compounds containing nitrogen and oxygen.

One object of the invention is to provide a novel compound containing as components fluorine, oxygen and nitrogen, said compound being relatively stable at normal atmospheric temperatures and being a powerful agent of oxidation.

A second object of the invention is to provide a novel and effective method of preparing the above described compound.

These and other objects will be apparent from consideration of the following specification and the appended claims.

It has heretofore been observed that bubbling of fluorine gases into concentrated nitric acid resulted in explosions apparently because of some chemical reaction of uncertain character. It has also been observed that the treatment of nitric oxide (NO) resulted in the formation of nitryl fluoride ($NO_2F$).

The present invention involves the discovery that if fluorine be bubbled into relatively dilute nitric acid at a comparatively low temperature, a definite chemical compound of the formula $NO_3F$, herein designated as nitrogen trioxy fluoride is formed and may, at suitable temperatures, be isolated.

The reaction of fluorine with nitric acid may be effected by simply bubbling fluorine into the acid in a convenient apparatus. One form of apparatus suitable for the purpose is disclosed in an article by George H. Cady, Journal of the American Chemical Society, Vol. 56, page 2635 (1934). The apparatus disclosed in the article is manufactured from any suitable material, such as nickel or Monel metal (an alloy of copper and nickel). Any other material which is sufficiently inert to the action of fluorine and nitric acid and of suitable physical properties may be substituted for these materials.

The concentration of the nitric acid employed in conducting the reaction may vary over a considerable range. However, satisfactory results may be obtained by employment of acid of a normality of about 3 to 6, and preferably of about 4. The reaction vessel containing the nitric acid is immersed in or otherwise contacted with a suitable cooling medium; e. g., cracked ice. The latter will, of course, produce a temperature of about 0 deg. C. Lower temperatures or even somewhat higher temperatures may also be employed. The fluorine gas may be generated in any convenient manner. It is bubbled beneath the surface of the nitric acid by means of a suitable delivery tube composed of a resistant metal; e. g., platinum.

Any of the other common methods of obtaining contact between a liquid and a gas may be employed. The best results are obtained if the fluorine gas is preliminarily admixed with air or other diluting gas. The proportion of the gas is not critical and reaction will proceed entirely in the absence of any gaseous diluent, but the diluent may also be increased to several times the volume of the fluorine.

It is desirable that the nitric acid and the fluorine be continuously delivered to the reaction vessel at such rate as to contact one liter of acid with about three liters of fluorine gas per hour. By increasing the efficiency of cooling, it is possible to increase the rate of feed of the reaction ingredients. Slower rates of feed are of course permissible.

The reaction product may be recovered by passing the gases from the reaction vessel through a suitable condenser which is cooled by a medium, such as boiling oxygen. The latter may be replaced by other media of suitable temperature. The reaction product apparently consisting essentially of $NO_3F$ condenses out as a white solid, which if warmed evolves a small amount of a gas or vapor having an odor similar to that of oxygen fluoride. There remains a solid product which upon gradual warming melts to a bluish, but clear and effervescent liquid that boils within a narrow range at about −42 degrees C. The limited boiling range suggests that the product is a substantially pure chemical compound. It is found that bubbling of the product in gaseous state through water at 25 degrees C. does not substantially change the boiling point. This tends to confirm the conclusion that the reaction product consists essentially of a single definite chemical compound. Vapor density determinations conducted upon the first and the last fractions of the boiling liquid check within less than one per cent of each other, thereby further confirming the conclusion that the product is essentially a pure chemical compound.

From the average of a plurality of vapor density determinations, it was calculated that the molecular weight of the compound lay within the range of 81 to 82 degrees, which checks closely with the theoretical molecular weight, or 81 of $NO_3F$ (nitrogen trioxy fluoride).

The compound is characterized by a pungent and irritating odor and it is highly toxic. The gas after it has once been prepared is quite stable at normal atmospheric temperatures, but if heated, it explodes with violence. It dissolves to an appreciable extent in water. It is a powerful oxidizing agent and will liberate iodine from potassium iodide. It also reacts with alkali metal hydroxides to liberate oxygen in the ratio of one-half volume of oxygen per volume of nitrogen trioxy fluoride gas. The compound possesses germicidal and insecticidal properties even when in relatively dilute form and the use of the material for such purposes is contemplated.

Although only the preferred forms of the invention have been described, it will be apparent to those skilled in the art that numerous modifications may be made therein without departure from the spirit of the invention or the scope of the appended claims.

What I claim is:

1. As a new chemical compound, $NO_3F$.
2. As a new chemical compound, a reaction product of fluorine and nitric acid, said product being an oxidizing agent, having a boiling point of about −42 degrees C., and being relatively stable at normal atmospheric temperatures.
3. A process of preparing nitrogen trioxy fluoride which comprises contacting cold dilute nitric acid with fluorine gas.
4. A process as defined in claim 3 in which the vapors from the reaction are cooled down to a temperature below approximately −42 degrees C. to condense nitrogen trioxy fluoride.
5. A process as defined in claim 3 in which 3 to 6 normal acid is employed.
6. A process of preparing nitrogen trioxy fluoride which comprises contacting moderately dilute nitric acid, at a temperature near or below 0 degree C., with a mixture of fluorine and a gaseous diluent.
7. A process as defined in claim 6 in which the inert gaseous diluent is nitrogen, oxygen or dry air.

GEORGE H. CADY.